(12) United States Patent
Wong et al.

(10) Patent No.: US 11,312,108 B2
(45) Date of Patent: Apr. 26, 2022

(54) FIBER REINFORCED METAL COMPOSITE AND APPLICATION THEREOF

(71) Applicant: Ka Shui Manufactory Co., Ltd., Kowloon Bay (HK)

(72) Inventors: Wai Chung Wong, Kowloon Bay (HK); Cheuk Nang Sung, Kowloon Bay (HK); Qiu Jin, Kowloon Bay (HK); Song Wang, Kowloon Bay (HK)

(*) Notice: Subject to any disclaimer, the term of this patent is extended or adjusted under 35 U.S.C. 154(b) by 551 days.

(21) Appl. No.: 16/116,918

(22) Filed: Aug. 30, 2018

(65) Prior Publication Data

US 2020/0047462 A1 Feb. 13, 2020

(30) Foreign Application Priority Data

Aug. 7, 2018 (CN) .......................... 201810892107.X

(51) Int. Cl.
*B32B 15/08* (2006.01)
*A45C 5/03* (2006.01)
(Continued)

(52) U.S. Cl.
CPC ................ *B32B 15/14* (2013.01); *A45C 5/02* (2013.01); *A45C 5/03* (2013.01); *B32B 5/02* (2013.01);
(Continued)

(58) Field of Classification Search
CPC ......... B32B 15/14; B32B 15/18; B32B 15/20; B32B 2250/40; B32B 2260/021; B32B 2260/046; B32B 2262/02; B32B 2262/0253; B32B 2262/0269; B32B 2262/065; B32B 2262/067; B32B 2262/101; B32B 2262/103; B32B 2262/106; B32B 2307/50; B32B 2307/54; B32B 2307/558; B32B 2307/708; B32B 2307/718; B32B 2605/00; B32B 2605/18; B32B 5/12; B32B 5/26; B32B 5/02; B32B 15/08; B32B 7/12; B32B 37/10;
(Continued)

(56) References Cited

U.S. PATENT DOCUMENTS 3,721,597 A * 3/1973 Colburn .................. B32B 15/08
156/313
2011/0052910 A1 * 3/2011 Gunnink .................. B32B 5/26
428/337

(Continued)

*Primary Examiner* — Walter Aughenbaugh
(74) *Attorney, Agent, or Firm* — Prakash Nama; Global IP Services, PLLC

(57) ABSTRACT

In one aspect, the present invention provides a fiber reinforced metal composite comprising a metal layer and a fiber layer which are arranged in a stack, and adjacent layers are fixed by bonding; the composite has a two-layered or three-layered structure, wherein one layer is closely adhered to another layer and the thickness of the layer is from 0.6 mm~0.9 mm. Such structure changes the structure of the existing fiber metal composite characterized by generally having more than three layers, and greatly reduces the thickness of the composite while maintaining good mechanical properties. In another aspect, the present invention discloses an application of fiber reinforced metal composite in the field of luggage case manufacturing, provides two preparation methods for providing fiber reinforced metal case shell with simple and available operations.

6 Claims, 1 Drawing Sheet

(51) Int. Cl.
  *B32B 15/14* (2006.01)
  *B32B 5/02* (2006.01)
  *B32B 7/12* (2006.01)
  *B32B 37/10* (2006.01)
  *B32B 37/12* (2006.01)
  *A45C 5/02* (2006.01)
  *B32B 38/00* (2006.01)

(52) U.S. Cl.
  CPC ............... *B32B 7/12* (2013.01); *B32B 15/08* (2013.01); *B32B 37/10* (2013.01); *B32B 37/1207* (2013.01); *B32B 38/0004* (2013.01); *A45C 2005/037* (2013.01); *B32B 2250/02* (2013.01); *B32B 2250/03* (2013.01); *B32B 2439/00* (2013.01)

(58) Field of Classification Search
  CPC ............ B32B 37/1207; B32B 38/0004; B32B 2439/00; B32B 2250/02; B32B 2250/03; B32B 37/1284; B32B 37/06; B32B 38/00; B32B 38/0036; B32B 2307/56; B32B 2307/714; B32B 2439/46; B32B 1/02; B32B 1/08; B32B 15/02; B32B 15/082; B32B 15/085; B32B 15/088; B32B 15/09; B32B 15/092; B32B 15/095; B32B 15/098; Y10T 428/249921; Y10T 428/266; A45C 5/02; A45C 5/03; A45C 2005/037; A45C 7/0018; A45C 7/0022; A45C 7/0027; A45C 7/0031; A45C 7/0036; A45C 7/0045; A45C 7/005; A45C 7/0054
  USPC ....... 428/457, 458, 221, 447, 220, 323, 336, 428/461, 615, 138, 172, 304.4, 433, 446, 428/462, 141, 156, 317.9, 328, 339, 34.1, 428/411.1, 412, 469, 209, 212, 213, 428/292.1, 332, 35.8, 408, 426, 545, 702, 428/113, 117, 164, 174, 215, 306.6, 428/312.8, 337, 35.7, 36.91, 418, 425.8, 428/435, 442, 450, 460, 472, 480, 57, 428/600, 613, 100, 114, 131, 137, 166, 428/189, 195.1, 203, 219, 293.7, 299.4, 428/301.1, 307.7, 318.4, 319.1, 325, 329, 428/331, 344, 35.2, 372, 402, 403, 414, 428/430, 441, 448, 471, 472.2, 474.4, 428/483, 537.5, 539.5, 542.8, 546, 551, 428/596, 60, 608, 621, 654, 68, 688, 99, 428/107, 116, 119, 121, 13, 134, 148, 428/158, 162, 181, 201, 202, 206, 216, 428/218, 222, 292.4, 293.1, 293.4, 299.1, 428/308.4, 31, 311.11, 311.51, 312.2, 428/313.3, 313.9, 315.9, 317.1, 319.3, 428/327, 338, 347, 34.2, 34.3, 34.5, 353, 428/354, 355 AC, 355 N, 35.9, 367, 36.1, 428/36.3, 374, 376, 379, 392, 401, 40.1, 428/415, 41.8, 421, 422, 423.1, 425.1, 428/428, 429, 43, 436, 464, 47, 472.3, 428/473.5, 475.5, 476.1, 482, 492, 500, 428/501, 537.1, 556, 565, 570, 573, 576, 428/58, 594, 614, 622, 624, 625, 626, 428/634, 649, 650, 651, 653, 671, 674, 428/687, 689, 698, 703, 76, 97; 156/60, 156/196, 242, 245, 281, 92, 185, 272.6, 156/285, 307.7, 308.2, 329, 73.1, 73.5, 156/166, 169, 182, 189, 212, 220, 244.11, 156/272.2, 280, 313, 324, 327, 499, 156/89.11, 143, 150, 172, 184, 187, 192, 156/197, 222, 227, 228, 230, 239, 240, 156/241, 247, 252, 273.3, 289, 293, 156/304.1, 305, 306.3, 306.6, 307.1, 156/308.4, 309.6, 321, 330, 330.9, 331.7, 156/334, 431, 443, 47, 538, 62.2, 74, 77, 156/83, 89.28, 94
  See application file for complete search history.

(56) References Cited

U.S. PATENT DOCUMENTS

| | | | |
|---|---|---|---|
| 2011/0143154 A1* | 6/2011 | Wagh | C09D 5/08 428/472.3 |
| 2016/0069112 A1* | 3/2016 | Neumark | E05D 3/022 16/276 |
| 2017/0334168 A1* | 11/2017 | Dry | B32B 27/06 |

* cited by examiner

FIBER REINFORCED METAL COMPOSITE AND APPLICATION THEREOF

BACKGROUND OF THE INVENTION

The present invention belongs to the field of material, in particular, to a fiber reinforced metal composite and application in the field of luggage case manufacturing thereof.

At present, the hard luggage on the market usually uses plastic or metal as the raw material. Compared with the plastic luggage, the metal luggage has the advantages of high strength, long service life and high quality. Due to the high strength of aluminum alloys and the mature development of aluminum alloy surface treatment technology, metal luggages on the market are usually made of aluminum alloy. The disadvantages of aluminum alloy luggage are: (1) The weight is heavy, and in the case of the same thickness, the weight of the aluminum alloy luggage is about 2.5~3 times that of the plastic one; (2) the outer shell of the aluminum alloy is easily scratched, thereby affecting the aesthetic effects of the appearance; (3) it has a poor impact resistance, easy to be damaged during transportation.

In recent years, magnesium alloys have also been used as luggage body materials, and magnesium alloys have a lower density than aluminum alloys, which can reduce the weight of the luggage body by about ⅓; the magnesium alloy also has excellent resistance to external impact and excellent anti-damping properties. Therefore, the magnesium alloy luggage has the advantages of light weight and good shock absorption effect. However, if a luggage is made of a thinner magnesium alloy sheet alone, there is still a problem that the luggage is deformed by an external force; in addition, magnesium alloys are more susceptible to oxidation and corrosion, especially in high temperature and humid environments, which have an impact on the appearance of the product.

Therefore, there is an urgent need to develop a new type of composite that is light in weight, thin in thickness, and has excellent mechanical properties and corrosion resistance.

BRIEF SUMMARY OF THE INVENTION

Aiming at the deficiencies of the prior art, the present invention in one aspect provides a fiber-reinforced metal composite which has both excellent properties of fiber materials and metal materials and is not only light in weight, excellent in fatigue resistance, but also has good comprehensive mechanic performance and properties of easy-to-manufacture. In another aspect, the present invention discloses an application of fiber reinforced metal composite in the field of luggage case, that is, the fiber reinforced metal composite of the present invention is used to manufacture the luggage case and a corresponding manufacturing method is provided.

The fiber reinforced metal composite of the present invention comprises a metal layer and a fiber layer which are arranged in a stack, and adjacent layers are fixed by bonding; the composite has a two-layered or three-layered structure with one layer being closely adhered to another layer. Since the thermal expansion coefficients of the fiber layer and the metal layer differ greatly, the existing fiber metal composite usually has a structure of three or more layers with a thickness of a few millimeters or even centimeters. It balances the internal stress generated when the material is cured and cooled by using a symmetrical structure. However, the fiber reinforced metal structure composite of the present invention has a two-layered or three-layered structure so that the thickness of the composite is effectively reduced while simplifying the structural composition.

Further, the two-layered structure comprises an outer metal layer and an inner fiber layer which are bonded with each other by a room-temperature curing adhesive that aids in the curing of the material at a temperature of 20~30° C. By using the room-temperature curing adhesive, the bonding site between the fiber layer and the metal layer is produced at room temperature (20~30° C.), thereby preventing the heat-curing system from undergoing deformation due to the difference in material shrinkage.

Further, the three-layered structure comprises a first metal layer, a intermediate fiber layer and an second metal layer which are sequentially stacked and adjacent layers are bonded with each other by a room-temperature curing adhesive or a heat-curing adhesives that aids in the curing of the material at a temperature of 40° C.~180° C.

Further, the composite has a thickness of 0.6 mm~0.9 mm.

Further, the metal layer is a magnesium alloy layer; the fiber layer is a fiber prepreg or a fiber cloth without resin, and the fiber material is a mixed fabric of one or more of carbon fiber, Kevlar fiber, polypropylene fiber and glass fiber.

Further, above fiber reinforced metal composite of the present invention is used to manufacture the luggage case, wherein the metal layer of the composite is a magnesium alloy layer, the fiber layer is a fiber prepreg or a fiber cloth without resin, and the fiber material is a mixed fabric of one or more of carbon fiber, Kevlar fiber, polypropylene fiber and glass fiber. The present invention also discloses a preparation method for the shell of fiber reinforced magnesium alloy luggage case, which is applicable to a composite of two-layered structure and three-layered structure and specifically comprises steps of:

S1, preparing a magnesium alloy fiber composite with two-layered or three-layered structure so as to partially cure the magnesium alloy fiber composite;

S2, processing the partially cured magnesium alloy fiber composite in step S1 into a box shape by hot press forming or bending forming;

S3, completely curing the shell composite.

In above steps, step S2 is realized by a hot pressing or a bending machine. When the hot press forming is used, the hot pressing temperature is between 20° C. and 140° C., the time for pressure application is 3~15 min and the pressure is 0.2~1 MPa; in particular, for hot pressing below 50° C., three or four stages of pressurization should be used, and the speed for pressure application should be slower. When the bending forming method is used, the bending temperature is between 20° C. and 140° C. and the bending time is 15 s~1 min.

Further, specifically, step S1 in above preparation method is realized by the following processes of:

S1.1, cutting a magnesium alloy sheet into a desired shape and then surface-treating the cut magnesium alloy sheet so as to form a protective layer on the surface of the magnesium alloy;

S1.2, bonding the magnesium alloy layer to the fiber layer by a room-temperature curing adhesive or a heat-curing adhesive to form a two-layered or three-layered magnesium alloy fiber composite, and rolling and pressing the stacked and bonded composite repeatedly with a roller so as to ensure close adhesion between adjacent layers;

S1.3, after completing step S1.2, while attaching a high-temperature-resistant polymer film to the upper and lower surfaces of the magnesium alloy fiber composite and treating the magnesium alloy fiber composite by hot pressing so as to further closely adhere the layers of materials, partially curing the adhesive between layers with a hot pressing pressure of 0.2~1 MPa, a hot press temperature of 20~180° C. and a hot press time of 10~30 minutes; the hot pressing pressure is carefully selected to facilitate the adhesive entering the micropores of the metal surface to achieve a good bond between the adhesive and the metal.

It should be noted in step S1.1 that the surface treatment of the magnesium alloy includes the following steps of:

S1.1.1, treating the surface of the magnesium alloy by sandblasting or mechanical sanding, removing the oxide layer of magnesium alloy surface while making the surface have a certain roughness, and then washing the surface with water;

S1.1.2, degreasing the polished magnesium alloy, then removing the degreasing agent remaining on the surface of the magnesium alloy by ultrasonic washing, and drying the surface of the magnesium alloy with compressed air;

S1.1.3, chemically passivating or micro-arc oxidation operating the dried magnesium alloy to form a corrosion-resistant protective layer having a microporous structure on the surface of the magnesium alloy, wherein the chemical passivation is performed in a phosphate, silicate or stannate solution and the micro-arc oxidation is performed in a solution of phosphate and/or silicate to form a micro-arc oxidation layer with a thickness between 1~5 μm, preferably 2~4 μm; then drying the treated magnesium alloy;

in order to achieve a better bonding force between the magnesium alloy and the fiber layer, a chemical treatment step for the passivation layer or the micro-arc oxidation layer may be added after step S1.1.3, that is, the magnesium alloy obtained in step S1.1.3 is immersed in an amine aqueous solution or an amine alcohol solution for 5~15 min, and then placed in an oven at 50° C.~60° C. for 10~30 min to be dried. The amine aqueous solution may be an aqueous solution of ethylenediamine, an aqueous solution of diethylenetriamine or an aqueous solution of m-phenylenediamine; the amine alcohol solution is ethylenediamine-ethanol solution, diethylenetriamine-ethanol solution or m-phenylenediamine-ethanol solution; above aqueous amine solution or amine alcohol solution has a mass percentage of 5%~25%.

Further, step S3 is performed at 20~30° C. on the magnesium alloy fiber composite that uses the room-temperature curing adhesive with the curing time of 1~5 hours; step S3 is performed at 120~180° C. on the magnesium alloy fiber composite that uses the heat-curing adhesive with the curing time of 30~60 min.

The present invention also provides another preparation method for the shell of fiber reinforced magnesium alloy luggage case, which is only applicable to a composite of two-layered structure and specifically comprises steps of:

S1, cutting a magnesium alloy sheet into a desired shape and then surface-treating the cut magnesium alloy sheet so as to form a protective layer on the surface of the magnesium alloy;

S2, processing the surface-treated magnesium alloy sheet into a box shape by hot press forming or bending forming;

S3, applying evenly the room-temperature curing adhesive to the inner surface of the magnesium alloy case shell obtained in step S2, further bonding a fiber material to the inner surface of the magnesium alloy case shell coated with the adhesive, and rolling the surface of the fiber layer with a roller so that the fiber layer is in close contact with the magnesium alloy case shell;

S4, placing the composite case obtained in step S3 in a mold and then placing in a pressure curing device with a curing temperature of 20~30° C., a curing pressure of 0.2~1 MPa, and a curing time of 10~30 min.

S5, placing the composite case shell completed in step S4 at 20~30° C. for 1 to 5 hours to completely cure the composite of case shell.

It should be noted that for step S2 of the second preparation method, when the hot press forming is used, the hot pressing temperature is 120~140° C., the time for pressure application is 1~5 min and the pressure is 0.2~1 MPa; when the bending forming method is used, the bending temperature is 120~140 and the bending time is 15 s~1 min.

The beneficial effects of the invention are:

(1) The present invention discloses a fiber reinforced metal composite comprising a metal layer and a fiber layer which are arranged in a stack. Compared with the metal fiber composite board existing in the prior art, the present invention has the advantages of simple structure (only having a two-layered or a three-layered structure), high temperature resistance and excellent comprehensive mechanical properties, creatively changes the structure of the existing fiber metal composite characterized by generally having more than three layers, and greatly reduces the thickness of the composite while maintaining good mechanical properties.

(2) The fiber reinforced magnesium alloy composite having a two-layered structure or a three-layered structure can be subjected to subsequent heat treatment. After being placed at 100° C.~180° C. for 30~60 min and then cooled to room temperature of 20~30° C., it has no obvious deformation phenomenon and the magnesium alloy layer and the fiber layer are still well bonded.

(3) The metal layer of the present invention may be a magnesium alloy. Compared with the aluminum alloy luggage case on the market, the luggage case made of fiber reinforced magnesium alloy composite has the advantages of reducing about ⅓ weight, strong impact resistance and good shock absorption effect. The luggage case made of fiber reinforced magnesium alloy composite has superior comprehensive mechanical properties as compared with the luggage case made of magnesium alloy, and has strong resistance to external force extrusion, which can greatly reduce the risk of transportation damage. In addition, the surface of the fiber reinforced magnesium alloy composite of the present invention has a protective layer, which can effectively prevent corrosion and oxidation on the surface, thereby prolonging the service life.

(4) The present invention provides two preparation methods for the fiber reinforced magnesium alloy case shell which may be selected according to actual needs and the structural composition of the fiber reinforced magnesium alloy composite, and the operation is flexible and convenient.

DETAILED DESCRIPTION OF THE INVENTION

The invention will be further described in combination with drawings and embodiments without limiting the scope of the present invention.

Embodiment 1

Figure 1:
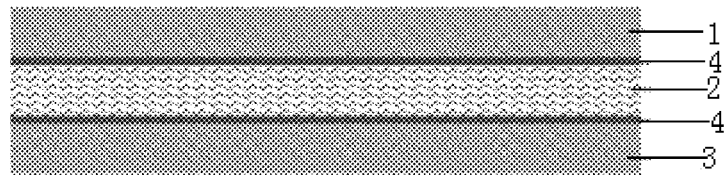
FIG. 1 is a structural view of fiber reinforced magnesium alloy structure composite in Embodiment 1.

The present embodiment discloses a fiber reinforced magnesium alloy composite and a method for processing a case shell by using the fiber reinforced magnesium alloy composite. As shown in FIG. 1, the composite is a three-layered structure (i.e.: sandwich structure) comprising a first magnesium alloy layer 1, a intermediate fiber layer 2 and a second magnesium alloy layer 3 which are sequentially stacked, and adjacent layers are bonded tightly with each other by an adhesive 4; the total thickness is 0.81 mm. Among them, the magnesium alloy used in this embodiment is AZ31B, and the thickness of the AZ31B sheet is 0.3 mm; the fiber layer 2 used in this embodiment is a 3K carbon fiber prepreg, the 3K carbon fiber prepreg has a thickness of 0.35 mm and the carbon fiber prepreg contains 42% epoxy resin. The adhesive used in this embodiment is a mixture of E-51 epoxy resin and TZ-550 curing agent. The performance parameters of the fiber reinforced magnesium alloy composite of this embodiment are shown in Table 1.

Figure 2:
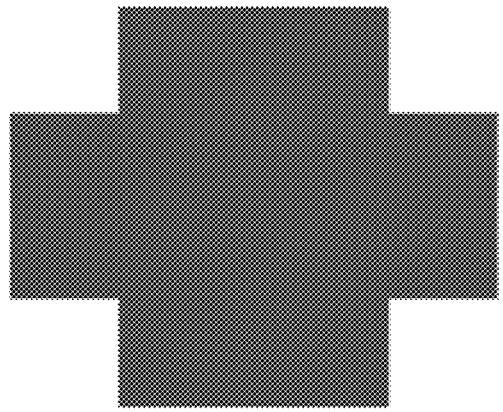
FIG. 2 is a view of the shape of the AZ31B magnesium alloy sheet cut in Embodiments 1 to 3.

The preparation method of the fiber reinforced magnesium alloy composite of the present embodiment is provided and the operation process for processing the same into a case shell are steps of:

S1, cutting the AZ31B magnesium alloy sheet into a shape shown in FIG. 2 and then surface-treating the cut magnesium alloy sheet so as to form a protective layer on the surface of the magnesium alloy to obtain a first magnesium alloy layer 1 and a second magnesium alloy layer 3;

S2, applying the adhesive 4 evenly to the surface of the first magnesium alloy layer 1 with an amount of the adhesive 4 being 0.008 g/cm2;

S3, cutting the 3K carbon fiber prepreg into a shape suited for the first magnesium alloy layer 1, then laying on the surface of the first magnesium alloy layer coated with the adhesive 4, and pressing slightly to be in close contact with each other to form an intermediate fiber layer 2;

S4, applying evenly a small amount of the adhesive 4 to the intermediate fiber layer 2 with the amount of the adhesive 4 being 0.004 g/cm2 and placing the second magnesium alloy layer 3 on the intermediate fiber layer 2 coated with the adhesive to form a sandwich structure;

S5, closely adhering and partially curing the stacked and bonded sandwich composites in step S4;

S6, bending the sandwich composites of step S5 into a case shell shape by bending forming with a bending temperature of 120° C.;

S7, completely curing the case shell composite to obtain a fiber reinforced magnesium alloy case shell with a curing temperature of 140° C. and a curing time of 45 min.

The adhesive involved in above steps is a heat-curing adhesive prepared by mixing E-51 epoxy resin and TZ-550 curing agent at a weight ratio of 6.6:1. In addition, it should be noted that for above step S1, the surface treatment of the magnesium alloy sheet specifically includes the following steps of:

S1.1, grinding the surface of magnesium alloy with 120 silicon carbide sandpaper or sand blasting to remove the oxide layer of magnesium alloy surface while making the surface have a certain roughness, and then washing the dirt on the surface with water;

S1.2, degreasing the polished magnesium alloy, then removing the degreasing agent remaining on the surface of the magnesium alloy with ultrasonic washing, and drying the surface of the magnesium alloy with compressed air;

S1.3, micro-arc oxidation operating the magnesium alloy treated by step S1.2 to create a protective layer having a microporous structure and performance of corrosion-resistant on the surface of the magnesium alloy, wherein the micro-arc oxidation electrolyte is a mixed solution of silicate and phosphate and the generated micro-arc oxidation layer has a thickness of 4 μm, then drying the magnesium alloy treated by the micro-arc oxidation;

S1.4, immersing the magnesium alloy obtained in step S1.3 in an ethylenediamine-ethanol solution having a mass concentration of 15% for 10 min, and then drying in an oven at 55° C. for 15 min.

For step S5, it should be noted that step S5 specifically includes the following operations of:

S5.1, rolling and pressing the sandwiched composite repeatedly with a roller so as to ensure close adhesion between different layers;

S5.2, attaching the upper and lower surfaces of the sandwiched composite respectively with a high temperature-resistant polyimide film, and then placing between the upper heating plate and the lower heating plate of the flat hot press;

S5.3, partially curing the sandwiched composite by hot pressing at a pressure of 0.2 MPa with a hot pressing temperature of 45° C. and a pressing time of 30 min.

Embodiment 2

Figure 3:
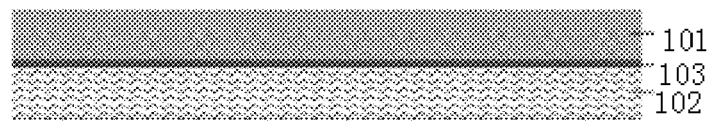
FIG. 3 is a structural view of fiber reinforced magnesium alloy structure composite in Embodiments 2 and 3.

The present embodiment provides a fiber reinforced magnesium alloy composite and a method for processing a case shell thereof. As shown in FIG. 3, the composite has a two-layered structure with a thickness of 0.6 mm and includes an outer magnesium alloy layer 101 and an inner fiber layer 102. The outer magnesium alloy layer 101 is made of AZ31B, and the AZ31 B sheet has a thickness of 0.5 mm; the inner fiber layer 102 is a 1K carbon fiber cloth, and the 1K carbon fiber cloth has a thickness of 0.3 mm. The outer magnesium alloy layer 101 and the inner fiber layer 102 are bonded and fixed by the room-temperature curing adhesive 103, so that the outer magnesium alloy layer 101 and the inner fiber layer 102 are closely attached to each other. The adhesive 103 used in this embodiment is a mixture of E-51 epoxy resin, TZ-550 curing agent and curing accelerator 2,4,6-tris(dimethylaminomethyl)phenol, which is a room-temperature curing adhesive 103, so that the bonding site between the inner fiber layer 102 and the outer magnesium alloy layer 101 is generated at a room temperature of 20~30° C., thereby preventing the deformation phenomenon from appearing due to the difference in material shrinkage rate in the cooling phase of the heat curing system. The performance parameters of the fiber reinforced magnesium alloy composite of this embodiment are shown in Table 1.

The preparation of the fiber reinforced magnesium alloy composite of the present embodiment is provided and the operation process for processing the same into a case shell are steps of:

S1, cutting the AZ31 B magnesium alloy sheet into a shape shown in FIG. 2 and then surface-treating the magnesium alloy sheet so as to form a micro-arc oxidation layer on the surface of the magnesium alloy to obtain the outer magnesium alloy layer 101;

S2, applying the adhesive 103 evenly to the surface of the outer magnesium alloy layer 101 obtained in step S1 with an amount of the adhesive 103 being 0.02 g/cm2;

S3, cutting the 1K carbon fiber prepreg into a shape suited for the outer magnesium alloy layer 101, then laying on the surface of the outer magnesium alloy layer 101 coated with the adhesive 103, and pressing tightly until the adhesive 103 penetrates into the surface of the carbon fiber cloth and is evenly distributed to form the inner fiber layer 102;

S4, closely adhering and partially curing the stacked, bonded and fixed two-layered composites in step S3;

S5, pressing the partially cured two-layered composite in step S4 is into a case shell shape by a hot press equipped with a case shell mold with a pressing temperature of 40° C., and applying a four-staged pressing method to exert a force;

S6, completely curing the case shell composite material, and placing the partially-cured case shell at a room temperature of 20° C.~30° C. for 4 hours to obtain a fiber reinforced magnesium alloy case shell.

For above steps, it should be noted that the adhesive 103 involved belongs to the room-temperature curing adhesive 103, which is obtained by evenly mixing the E-51 epoxy resin and TZ-550 curing agent at a weight ratio of 6.6:1, then adding 2,4,6-tris(dimethylaminomethyl)phenol at 3.5% of the total weight and stirring evenly. In addition, the operation process of step S1 is the same as step S1 of the Embodiment 1.

For step S4, it should be noted that step S4 includes the following operations of:

S4.1, attaching the upper and lower surfaces of the two-layered composite respectively with a high temperature-resistant polyimide film, then rolling the composite several times with a roller, and subsequently placing between the upper heating plate and the lower heating plate of the flat hot press;

S4.2, partially curing the composite by hot pressing at a pressure of 0.4 MPa with a hot pressing temperature of 25° C. and a pressing time of 30 min.

For step S5 in the operation process, it should be noted that the four-staged force application method is specifically as follows: in the first stage, the pressure is 0.0008 MPa and the duration is 60 s; in the second stage, the pressure is 0.002 MPa and the duration is 120 s; in the third stage, the pressure is 0.006 MPa and the duration is 200 s; in the fourth stage, the pressure is 0.02 MPa and the duration is 520 s.

Embodiment 3

The present embodiment provides a fiber reinforced magnesium alloy composite and a method for processing a case shell thereof. The composite material has a two-layered structure having the same structural composition as in Embodiment 2, but having a thickness of 0.65 mm, including an outer magnesium alloy layer and an inner fiber layer. The outer magnesium alloy layer is made of AZ31B, and the AZ31 B sheet has a thickness of 0.4 mm; the inner fiber layer is a 3K aromatic carbon mixed fiber cloth, and the 3K aromatic carbon mixed fiber cloth has a thickness of 0.3 mm. The outer metal layer and the inner fiber layer are bonded and fixed by the room-temperature curing adhesive, so that the outer magnesium alloy layer and the inner fiber layer are closely attached to each other. The adhesive of the present embodiment is a mixture of a room-temperature curing epoxy resin adhesive and an epoxy resin curing agent, wherein the room temperature curing epoxy resin adhesive and the epoxy resin curing agent are respectively EL2 Epoxy Laminating of the easy composites company and fast curing agent AT30 FAST; the adhesive of the present embodiment belongs to a room-temperature curing adhesive such that a bonding site between the fiber layer and the metal layer is generated at room temperature, thereby preventing the deformation phenomenon from appearing due to the difference in material shrinkage rate in the cooling phase of the heat curing system. The performance parameters of the fiber reinforced magnesium alloy composite of this embodiment are shown in Table 1.

The preparation of the fiber reinforced magnesium alloy composite of the present embodiment is provided and the operation process for processing the same into a case shell are steps of:

S1, cutting the AZ31B magnesium alloy sheet into a shape shown in FIG. 2 and then surface-treating the magnesium alloy sheet so as to form a passivation layer on the surface of the magnesium alloy to obtain the outer magnesium alloy layer;

S2, processing the outer magnesium alloy layer into a casing shell shape by a bending machine with a bending temperature of 120° C. and a bending time of 20 s;

S3, applying evenly the adhesive to the inner surface of the magnesium alloy case shell obtained in step S2 with an amount of the adhesive being 0.02 g/cm2, further bonding the 3K aromatic carbon fiber cloth to the inner surface of the magnesium alloy case shell coated with the adhesive, pressing and adhering tightly until the adhesive penetrates into the inner surface of the fiber cloth and is evenly distributed;

S4, rolling the surface of the fiber layer with a manual roller so that the fiber layer is in close contact with the magnesium alloy case shell;

S5, placing the composite case shell obtained in step S4 in a mold coated with a mold release agent, and then placing the mold in a pressurization curing device with a pressure of 0.8 MPa at room temperature of 20~30° C. for 30 minutes to obtaining a partially cured composite case shell;

S6, placing the partially cured composite case shell of step S5 at a room temperature of 20~30° C. for 5 hours to completely cure the case shell composite to obtain a fiber reinforced magnesium alloy case shell.

For above steps, it should be noted that the operation process of step S1 is specifically the following steps of:

S1.1, grinding the surface of magnesium alloy with 120 silicon carbide sandpaper or sand blasting to remove the oxide layer of magnesium alloy surface while making the surface have a certain roughness, and then washing the dirt on the surface with water;

S1.2, degreasing the polished magnesium alloy, then removing the degreasing agent remaining on the surface of the magnesium alloy with ultrasonic washing, and drying the surface of the magnesium alloy with compressed air;

S1.3, performing a phosphate chemical passivation treatment on the magnesium alloy completed in step S1.2 with a treatment temperature of 30° C. for 5 min, and drying the passivated magnesium alloy;

S1.4, immersing the magnesium alloy obtained in step S1.3 in a diethylenetriamine aqueous solution having a mass concentration of 10% for 15 min, and then drying in an oven at 60° C. for 20 min.

The performance parameters of the fiber reinforced magnesium alloy composite of Embodiment 1, 2 and 3 are shown in detail in Table 1:

Table 1 shows comprehensive indicators for the fiber reinforced magnesium alloy composite of three embodiments.

| Parameters | Embodiment 1 | Embodiment 2 | Embodiment 3 |
| --- | --- | --- | --- |
| thickness (mm) | 0.81 | 0.60 | 0.65 |
| temperature resistance performance | no deformations at 150° C. for 5 h and 180° C. for 1 h | no deformations at 150° C. for 2 h and 180° C. for 1 h | no deformations at 150° C. for 2 h and 180° C. for 1 h |
| tensile strength (MPa) | 400 | 380 | 420 |
| tensile modulus (GPa) | 15 | 12 | 13 |
| density (g/cm$^3$) | 1.81 | 1.79 | 1.82 |
| specific strength (Nm/kg) | $2.2 \times 10^5$ | $2.1 \times 10^5$ | $2.3 \times 10^5$ |
| specific modulus GPa/(g/cm$^3$) | 8.3 | 6.7 | 7.1 |

As can be seen from the above table, the fiber reinforced magnesium alloy composites of the three embodiments maintain excellent comprehensive mechanical properties while maintaining a large thickness, and have excellent temperature resistance, and solve the defects that the existing fiber metal composite has poor impact resistance, complicated structure, a thickness of several millimeters or even centimeters. The luggage case made of above fiber reinforced magnesium alloy composites has the advantages of light weight, good shock absorption effect and extremely low risk of damage.

The above description is only preferred embodiments of the present invention and is not intended to limit the present invention in any way. It should be noted that those skilled in the art may make some improvements and modifications without departing from the principle of the present invention. These improvements and modifications should also be regarded as the scope of protection of the present invention.

What is claimed is:

1. A fiber reinforced metal composite, characterized by comprising at least one metal layer, treated by micro-arc oxidation surface treatment by micro-arc oxidation electrolyte being a mixed solution of silicate and phosphate to form a micro-arc oxidation layer on a surface of each of said at least one metal layer; each of said at least one metal layer having the micro-arc oxidation layer is further treated by being immersed in an ethylenediamine-ethanol solution having a mass concentration of 15% for 5 to 15 minutes, and then dried in an oven at 50 to 60° C. for 10 to 30 minutes; said at least one metal layer is a magnesium alloy layer; said micro-arc oxidation layer is a corrosion-resistant protective layer having micropores; and further comprising a single fiber layer; said at least one metal layer and the single fiber layer are arranged in a stack, and the micro-arc oxidation layer of said at least one metal layer and the single fiber layer are adhered by adhesive which enters the micropores to achieve bonding between the adhesive and said at least one metal layer; the composite is a two-layered or three-layered structure, wherein the two-layered structure comprises one metal layer and the single fiber layer, and the three-layered structure comprises the single fiber layer sandwiched between two metal layers.

2. The fiber reinforced metal composite according to claim 1, characterized in that, in the two-layered structure, said one metal layer and the single fiber layer are bonded with each other by a room-temperature curing adhesive that cures at a temperature of 20 to 30° C.

3. The fiber reinforced metal composite according to claim 1, characterized in that, in the three-layered structure, one of the two metal layers and the single fiber layer, and another one of the two metal layers and the single fiber layer, are in each case bonded with each other by a room-temperature curing adhesive or a heat-curing adhesive that cures at a temperature of 40° C. to 180° C.

4. The fiber reinforced metal composite according to claim 1, characterized in that the fiber reinforced metal composite has a thickness of 0.6 mm to 0.9 mm.

5. The fiber reinforced metal composite according to claim 4, characterized in that the single fiber layer is a fiber prepreg or a fiber cloth without resin, and the single fiber layer is made of material which is a mixed fabric of one or more of carbon fiber, polyamide fiber, polypropylene fiber and glass fiber.

6. A fiber reinforced magnesium alloy luggage case, characterized in that a shell of the luggage case is prepared by using the fiber reinforced magnesium alloy composite according to claim 5.

* * * * *